(12) United States Patent
Inoue

(10) Patent No.: US 7,271,909 B2
(45) Date of Patent: Sep. 18, 2007

(54) REGULATED AMOUNT MEASURING APPARATUS, AND REGULATED AMOUNT MEASURING PROGRAM STORAGE MEDIUM

(75) Inventor: Yasuo Inoue, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 324 days.

(21) Appl. No.: 10/999,959

(22) Filed: Dec. 1, 2004

(65) Prior Publication Data
US 2005/0122517 A1 Jun. 9, 2005

(30) Foreign Application Priority Data
Dec. 9, 2003 (JP) ............................. 2003-410541

(51) Int. Cl.
*G01J 3/46* (2006.01)
*G01J 3/50* (2006.01)
(52) U.S. Cl. .................. 356/402; 356/425; 250/226
(58) Field of Classification Search ................. 356/402
See application file for complete search history.

(56) References Cited
U.S. PATENT DOCUMENTS

| | | | | |
|---|---|---|---|---|
| 4,414,635 A | * | 11/1983 | Gast et al. ................ 382/165 |
| 4,505,589 A | * | 3/1985 | Ott et al. ................... 356/402 |
| 5,182,721 A | * | 1/1993 | Kipphan et al. ............ 382/112 |
| 5,870,530 A | * | 2/1999 | Balasubramanian ........ 358/1.9 |
| 5,973,800 A | * | 10/1999 | Usui et al. ................. 358/509 |
| 6,041,708 A | * | 3/2000 | Kipphan et al. ............ 101/365 |
| 6,389,968 B1 | * | 5/2002 | Sugimoto et al. ........... 101/365 |
| 2001/0010191 A1 | * | 8/2001 | Steinbacher ................ 101/202 |
| 2001/0030758 A1 | * | 10/2001 | Wendt et al. ................ 358/1.9 |
| 2002/0071120 A1 | * | 6/2002 | Tamagawa .................. 356/402 |

FOREIGN PATENT DOCUMENTS

| EP | 0 228 347 A1 | 7/1987 |
|---|---|---|
| JP | 2505434 B2 | 4/1996 |

* cited by examiner

Primary Examiner—Gregory J. Toatley, Jr.
Assistant Examiner—Jonathan Skovhoit
(74) Attorney, Agent, or Firm—Sughrue Mion, PLLC

(57) ABSTRACT

A regulated amount measuring apparatus indicates a difference between two colors, for example, a discrepancy between a color of a printed matter in proof and a target color, to provide an index for a color regulation. A profile of the printing machine of interest is stored. Two sets of colorimetry values obtained through twice colorimetry for a proof image and the printed matter of a proof for instance are converted through the color profile to obtain two sets of coordinate values on a device color space, for example, CMY color space. Differences $\Delta C$, $\Delta M$ and $\Delta Y$ between the two sets of coordinate values are computed and then displayed.

14 Claims, 13 Drawing Sheets

REGULATED AMOUNT MEASURING APPARATUS, AND REGULATED AMOUNT MEASURING PROGRAM STORAGE MEDIUM

BACKGROUND OF THE INVENTION

1. Field of the Invention

The present invention relates to a regulated amount measuring apparatus for indicating a difference between two colors, for example, a discrepancy between a color of a printed matter in proof and a target color, to provide an index for a color regulation, and a regulated amount measuring program storage medium storing a regulated amount measuring program, which causes an arithmetic processing apparatus such as a computer to operate as the regulated amount measuring apparatus.

2. Description of the Related Art

Hitherto, as an ink control process of a multi color offset press, it is generally performed that the substantially four steps of regulation, as set fourth below, are carried out to meet the target color of a proof sheet.

(1) Perform a mechanical regulation for a printing machine such as printing pressure.

(2) Contribute to optimization of a supply of moistening water in the actual printing.

(3) Monochromatic solid or monochromatic halftone of image is provided on a portion out of a printed image on a sheet, for example, a blank, and the optical density of this portion is measured so that an ink supply is controlled to meet the density control value obtained through experience.

(4) An operator of the printing machine performs on a visual basis an ink supply control to finally meet the proof image.

To perform the ink supply control in the item (4), there is a need for the operator to meet the proof image on a visual basis. Thus, there is a need to control ink supply for plates of cyan (C), magenta (M) and yellow (Y). At that time, for example, when a printed matter, which takes on a Y-tinge more than the proof image, is regulated, a decision as to whether a supply of Y-ink is to be suppressed, whether amounts of M-ink and C-ink are to be increased, or alternatively whether a supply of Y-ink is to be suppressed and in addition amounts of M-ink and C-ink are to be increased, is a difficult judgement in such an extent that only the skilled operator can do it.

As a device for measuring colors, there is known a calorimeter. The use of the calorimeter makes it possible to measure colors so as to obtain calorimetric values of CIEXYZ and L*a*b*, and catch a direction of discrepancy of a color. However, there is a rare operator who can read regulating amounts for ink of C, M and Y from the calorimetric values of CIEXYZ and L*a*b*.

As technique of automatically computing regulating amount of ink, Japanese Patent No. 2505434 discloses a method in which a relation of a partial differential between a color difference and a density difference of each of inks for C, M and Y in a target color gamut is measured beforehand, and instead of the measurement of ink density of the above-mentioned item (3), a chromaticity measurement of three color gray patch is carried out to compute a difference from chromaticity of proof, and the ink regulating amount is computed so that the computed difference from chromaticity of proof is minimum. According to the method disclosed in Japanese Patent No. 2505434, however, it is obliged to obtain data for the ink-regulating amount after the target color gamut is determined beforehand, and it is difficult in regulation of an arbitrary color. Thus, actually, in putting into practice, there is a need to determine control colors, such as multiplying halftone of 60% for instance, for C, M and. Y, respectively. To the contrary, in case of the actual printed matter, it is often happened that the important color is varied in accordance with the printed matter. And thus, according to the method disclosed in Japanese Patent No. 2505434, it is difficult to adequately cope with the printed matter.

Further, the method disclosed in Japanese Patent No. 2505434 is involved in putting into practice at the stage of a rough regulation of the ink supply. And thus to perform a fine regulation of colors, it is obliged to trust a skilled operator's experience and intuition.

SUMMARY OF THE INVENTION

In view of the foregoing, it is an object of the present invention to provide a regulated amount measuring apparatus suitable for obtaining an index for a regulation for matching a color now on regulation with a target color, for example, in case of the regulation of ink supply for C, M and Y, as mentioned above, and a regulated amount measuring program storage medium storing a regulated amount measuring program, which causes an arithmetic processing apparatus such as a computer to operate as the regulated amount measuring apparatus.

To achieve the above-mentioned object, the present invention provides a regulated amount measuring apparatus comprising:

a colorimetry section that measures colors;

a first storage section that stores a color profile associating coordinate values on a colorimetry color space representative of colorimetry values obtained through the colorimetry section with coordinate values on a device color space, wherein a plurality of primary colors adopted in an image output device is established as a coordinate axis;

a conversion section that converts the colorimetry values obtained through the colorimetry section into the coordinate values on a device color space via the color profile;

a computing section that computes differences between two sets of coordinate values on the device color space, which are obtained through conversion by the conversion section of two sets of colorimetry values obtained through twice colorimetry by the colorimetry section; and a display section that displays the differences computed by the computing section.

According to the regulated amount measuring apparatus of the present invention, a profile of the printing machine of interest is stored. Two sets of colorimetry values obtained through twice colorimetry for a proof image and the printed matter of a proof for instance are converted through the color profile to obtain two sets of coordinate values on a device color space, for example, CMY color space. Differences ΔC, ΔM and ΔY between the two sets of coordinate values are computed and then displayed. According to the regulated amount measuring apparatus of the present invention as mentioned above, it is possible to perform a regulation of an ink supply in printing for instance, without trusting a skilled operator's experience and intuition, since there is provided an index for a regulation for matching a color now on regulation with a target color.

In the regulated amount measuring apparatus of the present invention as mentioned above, it is preferable that the regulated amount measuring apparatus further comprises a first handler that discriminates a distinction between a first colorimetry and a second colorimetry, of the twice colorimetry that is a base for a computation of the differences by the computing section.

While it is acceptable that a sequence of a measurement is fixedly predetermined, for example, in such a manner that after resetting before a start of the measurement, a measurement of the first time is a measurement for the reference color, and a measurement of the second time is a measurement for the regulation color, the provision of the first handler makes it possible to perform first the measurement for the regulation color. This feature makes it possible to enhance a versatility of the measurement.

In the regulated amount measuring apparatus according to the present invention as mentioned above, it is preferable that the regulated amount measuring apparatus further comprises a second storage section that stores colorimetry values obtained through the first colorimetry, of the twice colorimetry that is a base for a computation of the differences by the computing section, or coordinate values on the device color space obtained from the colorimetry values via the color profile.

In this manner, if the second storage section is provided, it is possible that the reference color is measured once and the measured colorimetry values are stored in the second storage section, and thereafter, the second measurement, that is, the measurement of the regulation color is repeated over and over as the occasion arises, and an operation is carried out with the stored colorimetry values of the reference color to determine differences, and the differences are displayed. This feature makes it possible to avoid the necessity of repeated measurement of the reference color and thereby improving the operability.

In the regulated amount measuring apparatus according to the present invention as mentioned above, it is preferable that the regulated amount measuring apparatus further comprises a second handler that sets up factors for the plurality of primary colors independently of one another, wherein the computing section multiplies the differences computed in the computing section by the factors, and wherein the display section displays differences after multiplication by the factors in the computing section.

Even if the differences as mentioned above, for example, $\Delta C$, $\Delta M$ and $\Delta Y$, are determined and displayed, it is not always true that the differences, for example, the values of $\Delta C$, $\Delta M$ and $\Delta Y$, per se represent the regulated amount of ink supply. For this reason, the differences are multiplied by factors, for example, a, b and c, to determine $a \cdot \Delta C$, $b \cdot \Delta M$ and $c \cdot \Delta Y$, and $a \cdot \Delta C$, $b \cdot \Delta M$ and $c \cdot \Delta Y$ are displayed. This feature makes it possible to display the values meeting an operator's sense as to the regulated amount.

In the regulated amount measuring apparatus according to the present invention as mentioned above, it is preferable that the color profile associates the coordinate values on the colorimetry color space with coordinate values on the device color space, wherein colors of cyan (C), magenta (M), yellow (Y) and black (K) are established as a coordinate axis, wherein the regulated amount measuring apparatus further comprises a third handler that inputs the coordinate values on the device color space, and wherein the display section displays the coordinate values (C, M, Y, and K) on the device color space, which are determined by colorimetry for a first time, as well as the differences ($\Delta C$, $\Delta M$ and $\Delta Y$) determined by colorimetry for a second time.

If black (K) is inputted, and the values of CMYK consisting of black (K), and cyan (C), magenta (M), yellow (Y),
by the first measurement, are displayed, it is possible for an operator to know the values of CMYK by the first measurement per se other than the comparison with the reference color.

To achieve the above-mentioned object, the present invention provides a regulated amount measuring program storage medium storing a regulated amount measuring program, which causes an arithmetic processing apparatus to operate as the regulated amount measuring apparatus, the regulated amount measuring apparatus comprising:

an obtaining section that obtains colorimetry values;

a first storage section that stores a color profile associating coordinate values on a colorimetry color space representative of the colorimetry values obtained through the obtaining section with coordinate values on a device color space, wherein a plurality of primary colors adopted in an image output device is established as a coordinate axis;

a conversion section that converts the colorimetry values obtained through the obtaining section into the coordinate values on a device color space via the color profile;

a computing section that computes differences between two sets of coordinate values on the device color space, which are obtained through conversion by the conversion section of two sets of colorimetry values obtained in the obtaining section; and a display section that displays the differences computed by the computing section.

In the regulated amount measuring program storage medium storing a regulated amount measuring program according to the present invention as mentioned above, it is preferable that the regulated amount measuring apparatus further comprises a first handler that discriminates a distinction between a first colorimetry and a second colorimetry, of the two sets of colorimetry values which are a base for a computation of the differences by the computing section.

In the regulated amount measuring program storage medium storing a regulated amount measuring program according to the present invention as mentioned above, it is preferable that the regulated amount measuring apparatus further comprises a second storage section that stores colorimetry values obtained through the first colorimetry, of the two sets of colorimetry values which are a base for a computation of the differences by the computing section, or coordinate values on the device color space obtained from the colorimetry values via the color profile.

In the regulated amount measuring program storage medium storing a regulated amount measuring program according to the present invention as mentioned above, it is preferable that the regulated amount measuring apparatus further comprises a second handler that sets up factors for the plurality of primary colors independently of one another, wherein the computing section multiplies the differences computed in the computing section by the factors, and wherein the display section displays differences after multiplication by the factors in the computing section.

In the regulated amount measuring program storage medium storing a regulated amount measuring program according to the present invention as mentioned above, it is preferable that the color profile associates the coordinate values on the colorimetry color space with coordinate values on the device color space, wherein colors of cyan, magenta, yellow and black are established as a coordinate axis, wherein the regulated amount measuring apparatus further comprises a third handler that inputs the coordinate values on the device color space, and wherein the display section displays the coordinate values on the device color space, which are determined by colorimetry for a first time, as well as the differences determined by colorimetry for a second time.

DETAILED DESCRIPTION OF PREFERRED EMBODIMENTS

Embodiments of the present invention will be described with reference to the accompanying drawings.

Figure 1:
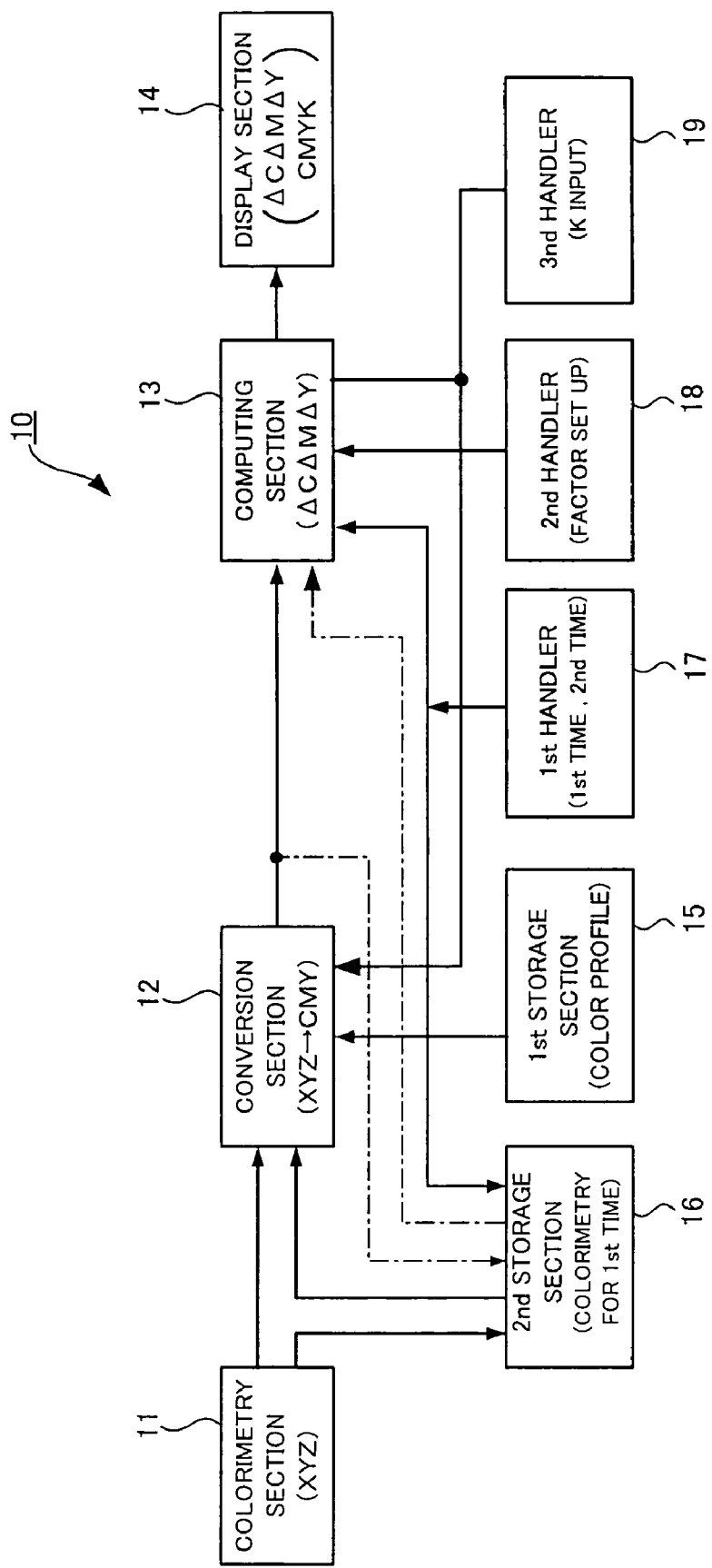
FIG. 1 is a block diagram of a regulated amount measuring apparatus according to an embodiment of the present invention.

FIG. 1 is a block diagram of a regulated amount measuring apparatus according to an embodiment of the present invention.

A regulated amount measuring apparatus 10 shown in FIG. 1 comprises a colorimetry section 11, a conversion section 12, a computing section 13, a display section 14, a first storage section 15, a second storage section 16, a first handler 17, a second handler 18, and a third handler 19.

The colorimetry section 11 has a function of measuring colors and corresponds to the function of the usual calorimeter. The colorimetry section 11 generates calorimetric values of CIEXYZ (hereinafter, those values are referred to as XYZ values).

The XYZ values, which are obtained by the colorimetry section 11, are fed to the conversion section 12 and the second storage section 16.

The first storage section 15 stores therein a color profile in which XYZ values that are coordinates values in a calorimetric color space wherein X, Y and Z denote coordinates axes are associated with CMYK values that are coordinates values in a CMYK color space wherein dot percents of color inks of C, M, Y and K for printing denote coordinates axes. The color profile is read from the first storage section 15 to the conversion section 12.

When the conversion section 12 receives from the colorimetry section 11 the XYZ values obtained through measurement by the colorimetry section 11, the conversion section 12 converts the XYZ values fed from the colorimetry section 11 to CMY values using a partial profile of K=0, of the color profile read from the first storage section 15. The thus converted CMY values are fed to the computing section 13.

Now assuming that the value of K is regulated beforehand, the conversion section 12 converts the XYZ values to the CMY values using the partial profile of K=0. While it is acceptable that the conversion section 12 converts the XYZ values to the CMY values using a partial profile according to the value of K that is regulated beforehand, the reason why the partial profile of K=0 is that the later determination of differences of C, M and Y brings about no large error, even if the partial profile of K=0 is used instead of the use of a partial profile according to the value of K.

The colorimetry section 11 performs a colorimetry on both the proof and the printed matter at the stage of the proof to obtain colorimetry values $X_t Y_t Z_t$ of the proof and colorimetry values XYZ of the printed matter. The conversion section 12 converts the colorimetry values $X_t Y_t Z_t$ and XYZ into CMY values $C_t M_t Y_t$ and CMY, respectively. Both the CMY values $C_t M_t Y_t$ and CMY are fed to the computing section 13. The computing section 13 computes differences $\Delta C \Delta M \Delta Y$ between the CMY values $C_t M_t Y_t$ and CMY, that is, $$\Delta C = C_t - C$$

$$\Delta M = M_t - M$$

$$\Delta Y = Y_t - Y$$

The thus computed differences $\Delta C \Delta M \Delta Y$ are fed to the display section 14, so that the display section 14 displays the differences $\Delta C \Delta M \Delta Y$.

An operator may regulate the supply of inks of C, M and Y in accordance with the display of the differences $\Delta C \Delta M \Delta Y$.

The second storage section 16 of the regulated amount measuring apparatus 10 shown in FIG. 1 stores therein a first colorimetry value, that is, the colorimetry values $X_t Y_t Z_t$ of the target value. When the colorimetry section 11 obtains a second colorimetry value, that is, colorimetry values XYZ of the printed matter at the stage of the proof, the colorimetry values XYZ of the printed matter are fed to the conversion section 12 so as to be converted into CMY values. And the first colorimetry values $X_t Y_t Z_t$ (of the target color), which are stored in the second storage section 16, are also fed to the conversion section 12 so as to be converted into CMY values $C_t M_t Y_t$. Hereinafter, in a similar fashion to that as mentioned above, the computing section 13 computes differences $\Delta C \Delta M \Delta Y$, and the display section 14 displays the differences $\Delta C \Delta M \Delta Y$.

The first handler 17 of the regulated amount measuring apparatus 10 shown in FIG. 1 causes the regulated amount measuring apparatus 10 to recognize whether a measurement to be carried out now is a measurement for obtaining the first colorimetry values (of the target color) or a measurement for obtaining the second colorimetry values (of the printed matter). Recognition of the regulated amount measuring apparatus 10 as to whether a measurement to be carried out now is a measurement for obtaining the first colorimetry values (of the target color) or a measurement for obtaining the second colorimetry values (of the printed matter) through operation of the first handler 17 makes it possible to carry out first either one of both the measurements. Further, according to the present embodiment, when the regulated amount measuring apparatus 10 recognizes that the measurement to be carried out now is a measurement for obtaining the first colorimetry values, the first colorimetry values, which are stored in the second storage section 16, are overwritten, and thereafter, in computation of the difference by the computing section 13, there are used $C_t M_t Y_t$ based on the first colorimetry values thus overwritten.

In the above description, the second storage section 16 stores the first colorimetry values $X_t Y_t Z_t$ (of the target value), which are obtained through the measurement by the colorimetry section 11. However, as shown with the dashed line in FIG. 1, it is acceptable that the first colorimetry values $X_t Y_t Z_t$ (of the target color), instead of the colorimetry values $X_t Y_t Z_t$, are fed to the conversion section 12 so as to be converted into the CMY values, and the CMY values $C_t M_t Y_t$ thus converted are stored. In this case, the CMY values $C_t M_t Y_t$ stored in the second storage section 16 are directly fed to the computing section 13 without passing through the conversion section 12. This arrangement makes it possible to avoid the necessity of inputting of the first colorimetry values $X_t Y_t Z_t$ to the conversion section 12 for the re-conversion, whenever the colorimetry section 11 measures the printed matter.

The second handler 18 of the regulated amount measuring apparatus 10 shown in FIG. 1 is a handler for setting a factor to be multiplied by a difference to be computed in the computing section 13. The second handler 18 may set independently factors a, b and c to be multiplied by differences $\Delta C$, $\Delta M$ and $\Delta Y$ to be computed in the computing section 13, respectively. When the factors a, b and c are set by the computing section 13, the computing section 13 multiplies the thus computed differences $\Delta C$, $\Delta M$ and $\Delta Y$ by the factors a, b and c set through the second handler 18, respectively to determine differences $a \cdot \Delta C$, $b \cdot \Delta M$ and $c \cdot \Delta Y$. The display section 14 displays the differences $a \cdot \Delta C$, $b \cdot \Delta M$ and $c \cdot \Delta Y$.

In this manner, setting of the factors a, b and c through the second handler 18 makes it possible to cause the display section 14 display to display the values, which match regulated amounts of ink supply for C, M and Y on a feeling basis.

The third handler 19 of the regulated amount measuring apparatus 10 shown in FIG. 1 is a handler for inputting values of K.

The regulated amount measuring apparatus 10 has both functions of display of the computed differences $\Delta C$, $\Delta M$ and $\Delta Y$ through twice colorimetry and display of CMYK values associated with colorimetry values obtained through once colorimetry. In this case, the colorimetry values XYZ are values expressed on a three-dimensional basis of X, Y and Z. To the contrary, the CMYK values are values expressed on a four-dimensional basis of C, M, Y and K. Accordingly, this form makes it impossible to unequivocally convert the colorimetry values XYZ into the CMYK values. Thus, according to the present embodiment, the value of K, which is set beforehand, is inputted by an operation of the third handler 19. Then, the conversion section 12 converts the colorimetry values XYZ, which is fed from the colorimetry section 11, into the CMY values referring to the partial profile of $K=K_0$ according to the value of K (where $K=K_0$) inputted through an operation of the third handler 19, of the color profiles read from the first storage section 15. The CMY values obtained through the conversion and the value of K inputted through an operation of the third handler 19 are fed to the display section 14 merely passing through the computing section 13, so that the display section 14 displays the CMYK values at the point measured by the colorimetry section 11. Thus, an operator can see an ink amount for C, M, Y and K at the point of measurement.

According to the above-mentioned description of the present embodiment, as a color profile stored in the first storage section 15, it is assumed that a printing machine and inks completely match the printing condition at the time when the printed matter is printed. It is noted, however, that the differences $\Delta C \Delta M \Delta Y$ are for setting up a standard for the regulated amount of ink supply, and thus do not need so much strictness as the absolute value. Even if the color profile is concerned with errors, when a color of the printed matter matches the target color, the differences become $\Delta C = \Delta M = \Delta Y = 0$. Accordingly, there is no need that the color profile to be used here completely matches the printing condition of the printed matter, and any one is acceptable, as the color profile to be used here, which roughly matches the printing condition of the printed matter.

According to the description of the present embodiment as mentioned above, there is raised an example in which a color of the printed matter matches the target color (a proof). However, the present invention is applicable to a case where there is stored a color profile describing an association between colorimetry values XYZ and RGB values representative of a color on a display screen of, for example, a CRT display and a liquid crystal display, and a light emission color on the display screen, instead of the printed matter, matches the target color. It is noted that the target color is not restricted to a color of the proof image, and it is acceptable that as the target color, a color of an image other than the image on a paper, for example, a color of cloth is adopted.

According to the description of the present embodiment as mentioned above, there is raised an example in which as the colorimetry values, CIEXYZ values are adopted. It is noted that there is no need that as the colorimetry values, CIEXYZ values are adopted, and it is acceptable that as the colorimetry values, L*a*b* values are adopted.

Further, according to the description of the present embodiment as mentioned above, there is raised an example in which as differences $\Delta C$, $\Delta M$ and $\Delta Y$, differences $\Delta C = C_t - C$, $\Delta M = M_t - M$, and $\Delta Y = Y_t - Y$, which are obtained through the subtraction of CMY of the CMY values of the printed matter from $C_t M_t Y_t$ of the CMY values of the target color, are displayed. Alternatively, however, it is acceptable that differences $\Delta C = C - C_t$, $\Delta M = M - M_t$, and $\Delta Y = Y - Y_t$, which are obtained through the subtraction of $C_t M_t Y_t$ of the CMY values of the target color from CMY of the CMY values of the printed matter, are displayed. Further, it is acceptable that both the modes are changed over.

Hereafter, the present embodiment will be explained more in detail referring to FIG. 2 to FIG. 13.

Figure 2:
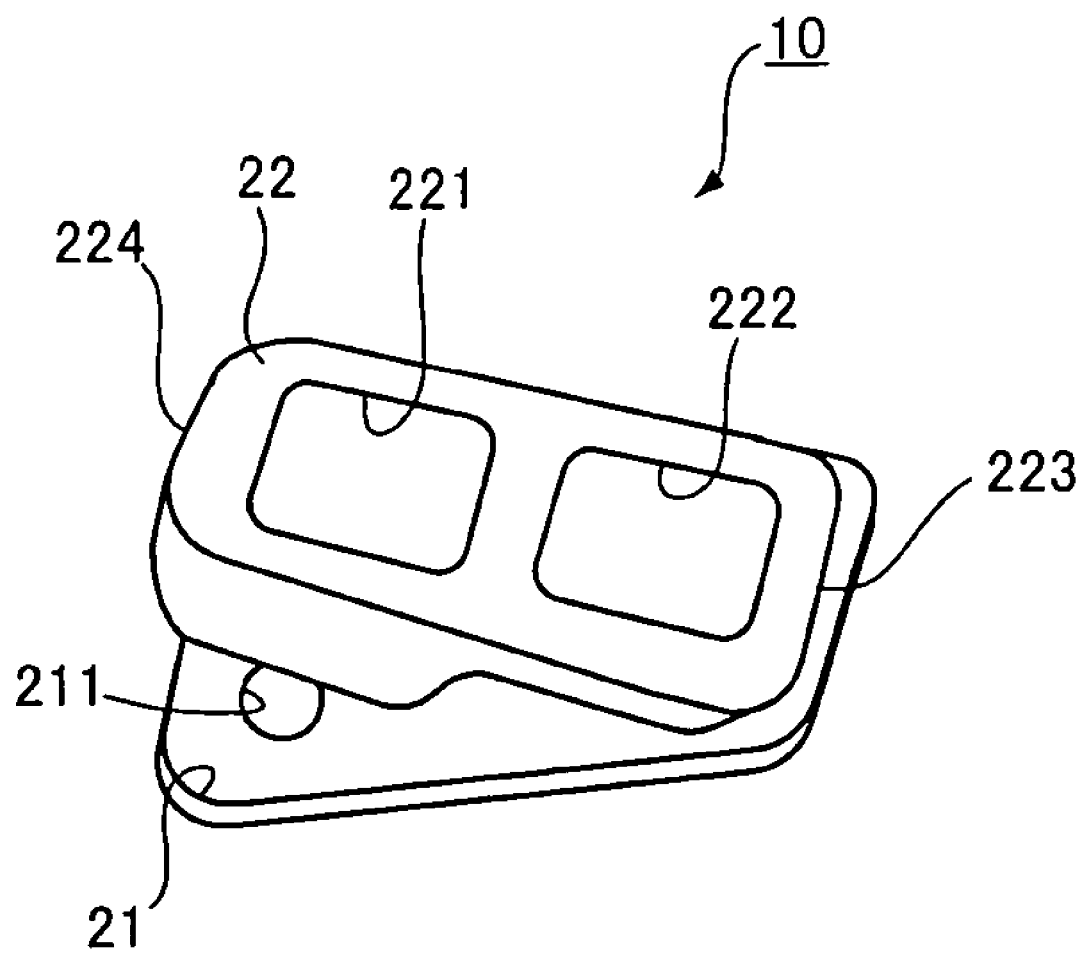
FIG. 2 is a perspective view of a regulated amount measuring apparatus 10 shown in FIG. 1.

FIG. 2 is a perspective view of the regulated amount measuring apparatus 10 shown in FIG. 1.

The regulated amount measuring apparatus 10 shown in FIG. 2 comprises a plate member 21 placed on a measurement object, and a measurement section 22 connected with the plate member 21 on a hinge basis.

The plate member 21 is provided with an aperture 211. The plate member 21 is placed on a measurement object in such a manner that a measurement point of the measurement object appears through the aperture 211.

The measurement section 22 comprises a display screen 221 for displaying measurement results and the like, and an operational panel 222 in which various handlers for operating the regulated amount measuring apparatus 10 are arranged. A rear edge 223 of the measurement section 22 is connected with the plate member 21 on a hinge basis. A front edge 224 of the measurement section 22 is enabled in such a manner that the front edge 224 opens with respect to the plate member 21 as shown in FIG. 2.

Below the measurement section 22, there is provided a measurement head 225 (cf. FIG. 3) at a position associated with the aperture 211 of the plate member 21.

An operator performs, on the operational panel 222, operations associated with operations of the first to third handlers 17 to 19, as the occasion demands, and then puts the plate member 21 on the measurement object so as to adjust a position of the measurement object in such a manner that a measurement point of the measurement object appears through the aperture 211. Next, when a measurement is performed when the front edge 224 side of the measurement section 22 is depressed, so that measurement results (differences ΔC, ΔM and ΔY) are displayed on the display screen 221. The measurement section 22 is detachable from the plate member 21 at the hinge portion of the rear edge 223. When the measurement section 22 is detached from the plate member 21, it is possible to measure a light emission color on the display screen, in the manner as will be described in conjunction with FIG. 3.

Figure 3:
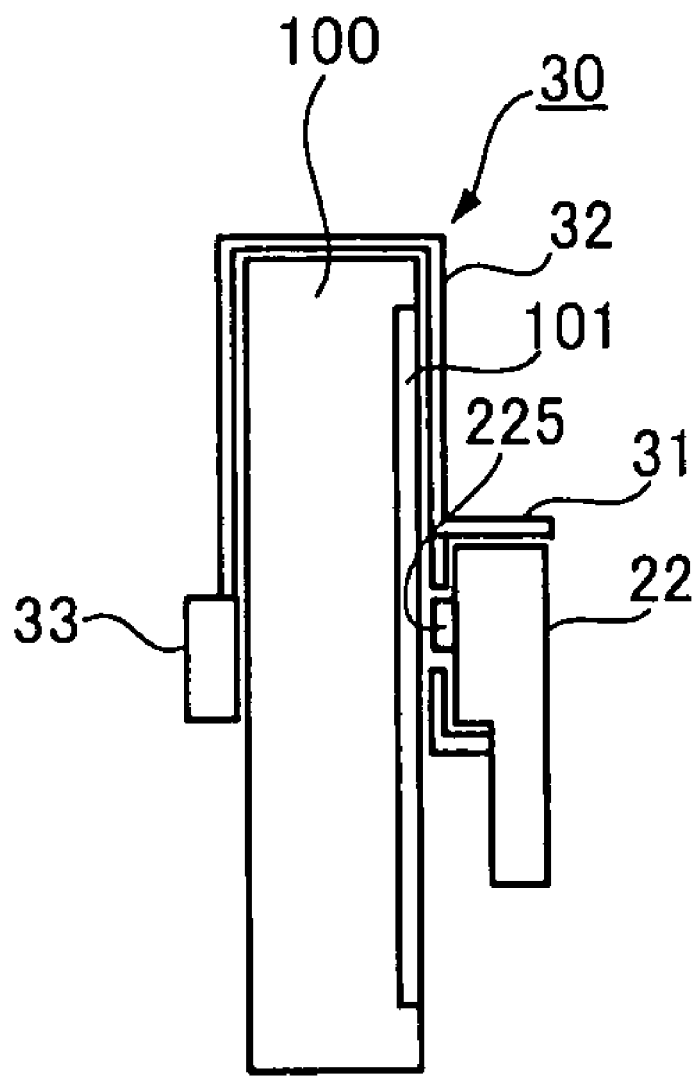
FIG. 3 is a typical illustration useful for understanding a state that the regulated amount measuring apparatus shown in FIG. 2 is used to measure a color on a display screen of a liquid crystal display unit.

FIG. 3 is a typical illustration useful for understanding a state that the regulated amount measuring apparatus shown in FIG. 2 is used to measure a color on a display screen of a liquid crystal display unit.

Here, there is used an attachment 30 comprising a bracket 31, a belt 32 and a weight 33.

The bracket 31 of the attachment 30 is located at the front of a display screen 101 of a liquid crystal display unit 100, the weight 33 is located at the back of the liquid crystal display unit 100, and the belt 32 is built between the bracket 31 and the weight 33.

Here, the measurement section 22 of the regulated amount measuring apparatus 10 shown in FIG. 2 is removed from the plate member 21 and is fitted into the bracket 31. The measurement head 225 of the measurement section 22 is regulated so as to be located at a position opposing to a desired measurement position on the display screen 101. When an operator depresses a measurement start button (not illustrated), the measurement on the measurement position is performed, so that the measurement results such as differences ΔC, ΔM and ΔY are displayed on the display screen 221 (cf. FIG. 2) of the measurement section 22.

Figure 4:
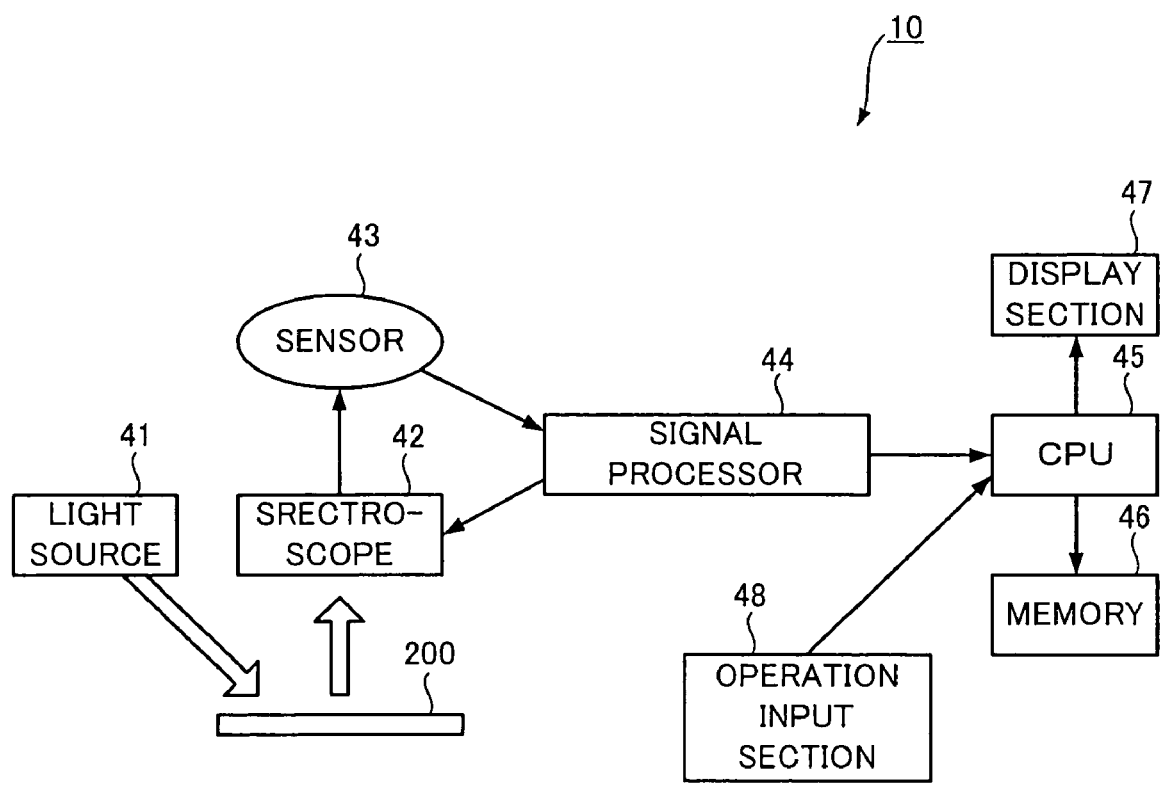
FIG. 4 is a block of a measuring section of the regulated amount measuring apparatus shown in FIG. 2.

FIG. 4 is a block of the measuring section 22 of the regulated amount measuring apparatus 10 shown in FIG. 2.

The measurement section 22 incorporates therein a light source 41. To perform a measurement, a measurement light, which is generated from the light source 41, is emitted from the measurement head 225 (cf. FIG. 3). The measurement light passes through the aperture 211 shown in FIG. 2 and irradiates the measurement point of a measurement object 200. The operational panel 222 of the measurement section 22 of the regulated amount measuring apparatus 10 shown in FIG. 2 is provided with a change over switch (not illustrated) for changing over between a mode that printed matters and the like, in which an image is displayed through reflection of external lights, are selected as the measurement object, and a mode that display units and the like, in which an image is displayed through self light emission as shown in FIG. 3, are selected as the measurement object. When the change over switch is switched to the mode that display units and the like are selected as the measurement object, the light source 41 is kept turn off. Here, there will be explained the mode that the plate member 21 shown in FIG. 21 is mounted, and an image on a sheet, such as the printed matter and the like, is selected as the measurement object.

The measurement light, which is generated from the light source 41 shown in FIG. 4, irradiates the measurement point of the measurement object. A light reflected on the measurement point and returned is taken through the measurement head 225 (cf. FIG. 3) into the measurement section 22, and then a spectrum is observed through a spectroscope 42 which is controlled by a signal processor 44. Lights of the respective wavelength, which are obtained by the observation of the spectrum through the spectroscope 42, are sequentially fed to a sensor 43 to measure light quantity on each wavelength. And the measured data is fed to the signal processor 44.

A memory 46 stores a color profile. A CPU 45 reads the color profile. Then the color profile is also fed to the signal processor 44. The signal processor 44 first computes XYZ values of the measurement point in accordance with the measurement data fed from the sensor 43, and then converts the XYZ values into CMY values in accordance with a color profile and computes differences ΔC, ΔM and ΔY between two sets of CMY values which are obtained through twice measurements (a measurement of the target color (a proofer) and a measurement of the printed matter). The differences ΔC, ΔM and ΔY thus computed are fed via a CPU 45 to a display section 47 to display the differences ΔC, ΔM and ΔY.

When an operator sets up one's desired one on the regulated amount measuring apparatus 10, the operator operates a handler arranged on an operation input section 48. The CPU 45 controls the associated sections of the regulated amount measuring apparatus 10 in accordance with the operation input. As one of the operations, there is an operation for setting up storage of the first colorimetry values. When this operation is performed, the colorimetry values (XYZ values) of the first colorimetry are fed to the memory 46 to store the colorimetry values (XYZ values). When arithmetic of the differences is performed, the first colorimetry values, which are stored in the memory 46, are read by the CPU 45 and fed to the signal processor 44.

A set of a portion of controlling the spectroscope 42 and a portion of computing the colorimetry values XYZ, of the light source 41, the spectroscope 42, the sensor 43, and the signal processor 44 in FIG. 4, corresponds to the colorimetry section 11 in FIG. 1. A portion of converting the XYZ values of the signal processor 44 into the CMY values corresponds to the conversion section 12 in FIG. 1. A portion of computing the differences ΔC, ΔM and ΔY, of the signal processor 44 corresponds to the computing section 13 in FIG. 1. The operation input section 48 in FIG. 4 corresponds to a compound of the first handler 17, the second handler 18, and the third handler 19, in FIG. 1 and the operational panel 222 in FIG. 2. The memory 46 corresponds to a compound of the first storage section 15 and the second storage section 16 in FIG. 1. The display section 47 corresponds to the display section 14 in FIG. 1 and the display screen 221 in FIG. 2. The CPU 45 controls the respective sections shown in FIG. 4.

Figure 5:
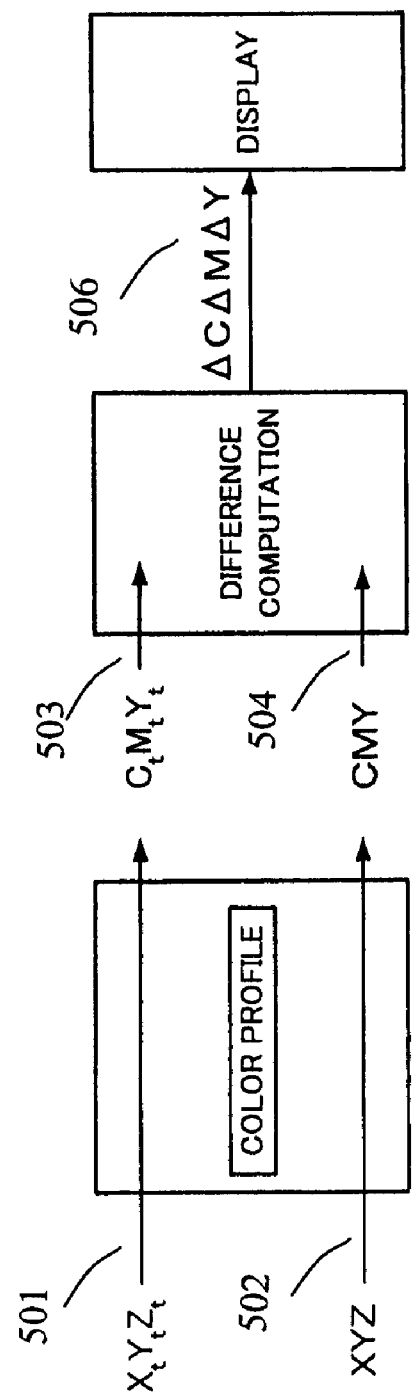
FIG. 5 is a typical illustration useful for understanding an arithmetic operation in the regulated amount measuring apparatus according to the embodiment of the present invention.

FIG. 5 is a typical illustration useful for understanding an arithmetic operation in the regulated amount measuring apparatus according to the embodiment of the present invention.

The target color is measured to determine colorimetry values $X_t Y_t Z_t$ 501, while the printed matter at the stage of the proof is measured to determine colorimetry values XYZ 502 of the printed matter. Those two sets of colorimetry values $X_tY_tZ_t$ 501 and colorimetry values XYZ 502 are converted into values $C_tM_tY_t$ 503 and values CMY 504 through the color profile, so that differences ΔCΔMΔY 506 are computed in accordance with formulas ΔC=$C_t$–C, ΔM=$M_t$–M, ΔY=$Y_t$–Y. Thus, the differences ΔCΔMΔY 506 are displayed.

As mentioned above, it is the main feature of the present embodiment that colorimetry values such as XYZ 502 are converted into CMY 504 values through the color profile, so that differences ΔCΔMΔY 506 are determined, and the differences ΔCΔMΔY 506 are displayed.

Figure 6:
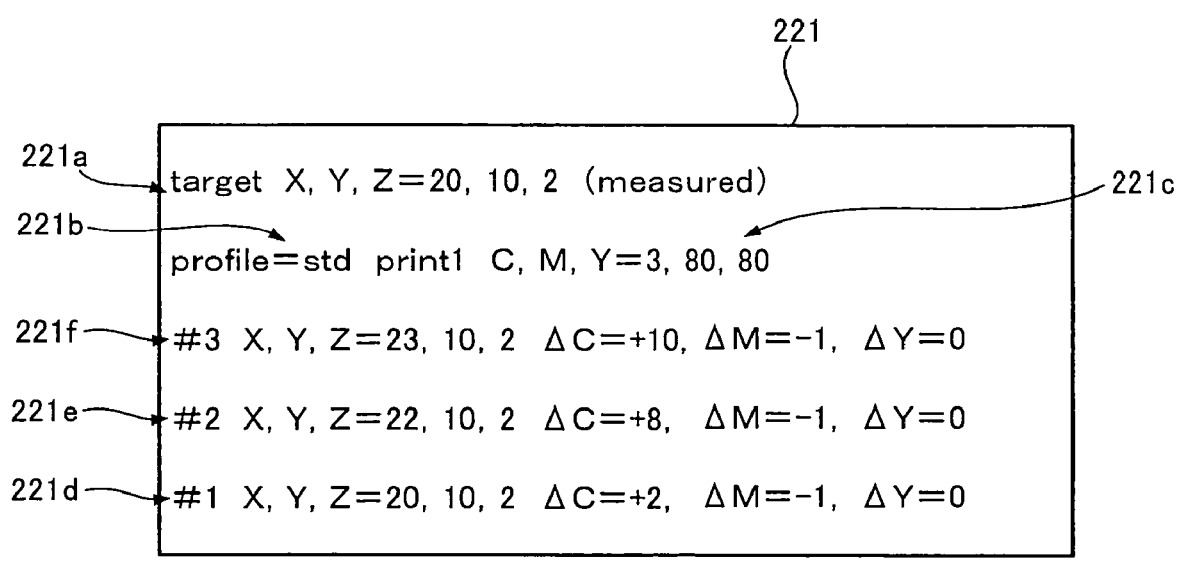
FIG. 6 is a view showing an example of a display on a display screen of the regulated amount measuring apparatus.

FIG. 6 is a view showing an example of a display on a display screen of the regulated amount measuring apparatus.

On a display screen 221, there are displayed colorimetry values 221*a* of the target color, a name 221*b* of a color profile to be used, and CMY values 221*c* where colorimetry values X, Y, Z=20, 10, 2 of the target color are converted into CMY values through the color profile.

According to the regulated amount measuring apparatus 10 of the present embodiment, it is assumed that pluralities of color profiles are stored, and a color profile, which matches the printing condition of the printed matter now to be printed, is read from among the pluralities of color profiles stored so as to be used for conversion of the colorimetry values from XYZ into CMY values.

Further, according to the regulated amount measuring apparatus 10 of the present embodiment, it is assumed that the colorimetry values 221*a* of the target color, or CMY values 221*c* where colorimetry values of the target color are converted, are stored, and then measurement of the printed matter for a proof is performed a plurality of times of number while a regulation for ink supply and a proof are repeated. And on the display screen 221 in FIG. 6, there are displayed a measurement result 221*d* for the first time of the printed matter, a measurement result 221*e* for the second time of the printed matter, and a measurement result 221*f* for the third time of the printed matter. According to the present embodiment, in the event that the printer matter is measured more number of times and it is difficult to display the measurement result on the display screen at once, the measurement result may be displayed on a scroll basis.

Next, there will be explained examples of utilization of the regulated amount measuring apparatus 10 of the present embodiment.

Figure 7:
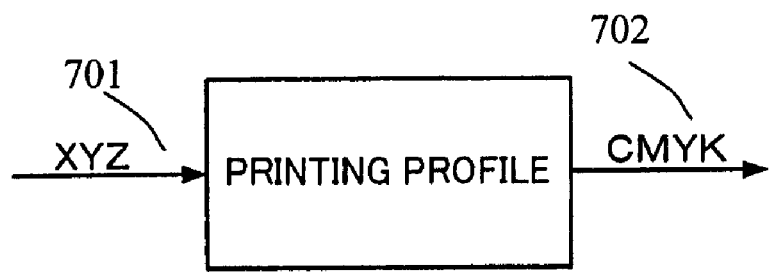
FIG. 7 is a typical illustration of a color profile.

FIG. 7 is a typical illustration of a color profile.

Here, first, after the mechanical regulation of the printing machine to be used is carried out, printing conditions, such as printing papers and ink sorts, are determined, a chart for color profile creation is printed, the printed chart is measured in colorimetry values XYZ 701, and a software for profile creation is utilized to create a color profile CMYK 702 (here, it is a profile for printing, and it is referred to as a printing profile) for providing an association between a dot % of ink at the time of the chart and a colorimetry value. A process of creating the printing profile per se is well known, and thus the redundant explanation will be omitted. The printing profile thus created is stored in the regulated amount measuring apparatus 10 of the present embodiment. When the printing profile is already created, the process of creating the printing profile is omitted.

Figure 8:
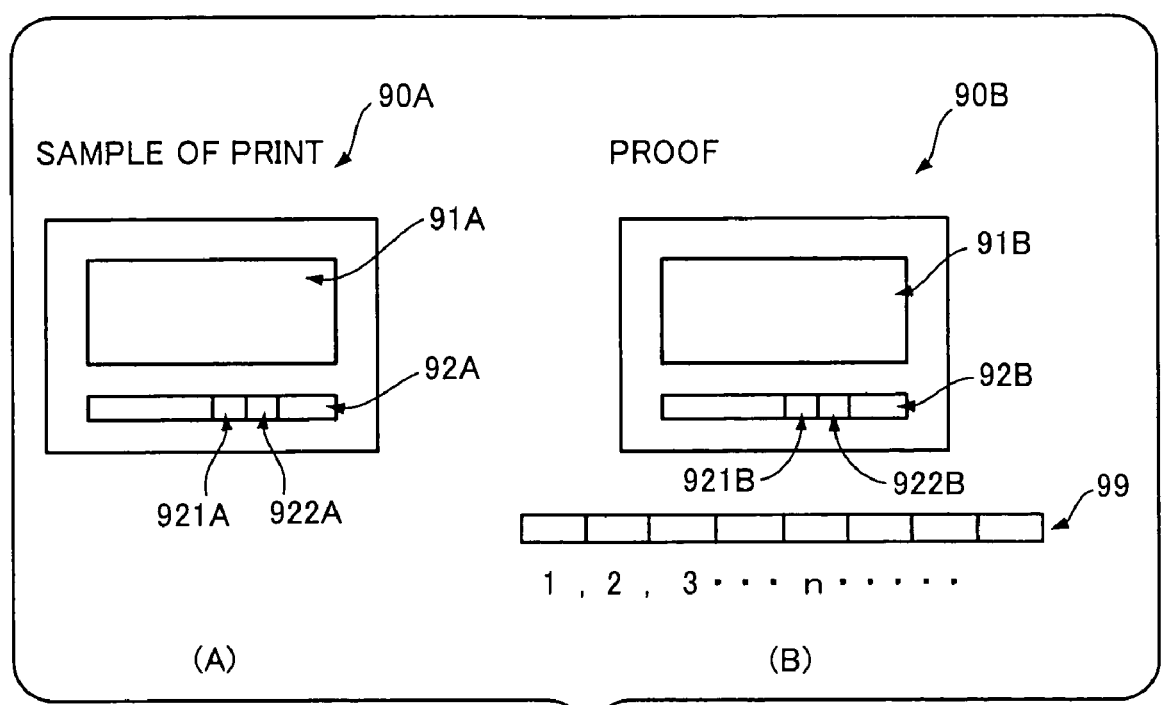
FIG. 8 is a typical illustration useful for understanding a process of a regulation of an ink supply of black (K).

FIG. 8 is a typical illustration useful for understanding a process of a regulation of an ink supply of black (K).

After the printing profile is created, as shown in FIG. 8, there are prepared a sample (proof) 90A of a print as the target color and a printed matter 90B of a proof. The sample 90A of a print and the printed matter 90B of a proof store image portions 91A and 91B, respectively, which record the essentially necessary images. Further, on the portions out of the image portions 91A and 91B, there are recorded control strips 92A and 92B for color regulation. On the control strips 92A and 92B, there are formed pairs of patches 921A and 921B of dot percentage 60% of K (hereinafter it is denoted as K60%) and patches 922A and 922B of gray of dot percentage 60% in which three colors of ink of C, M and Y are used in printing, to each of channels 1, 2, 3, . . . , n, . . . of ink keys 99 arranged for ink supply regulation of a printing machine, as typically shown in part (B) of FIG. 8.

Here density of patches 921A and 921B of K60% is measured. Ink supply of K is controlled in such a manner that difference ΔD=$D_t$–D is approximately near 0, where $D_t$ denotes a density of the patch 921A of K60% of the sample 90A of a print, and D denotes a density of the patch 921B of K60% of the printed matter 90B of a proof. This control is carried out on all channels as to the printing sheet width of the arranged ink keys 99. According to the present embodiment, an ink supply for K is controlled in accordance with gray of K60%. However, the present invention is not restricted to K60%, and it is acceptable that a patch of the solid of K, or 100% of K, instead of K60%, is created, and an ink supply for K is controlled in accordance with a density of the patch of K100%.

Figure 9:
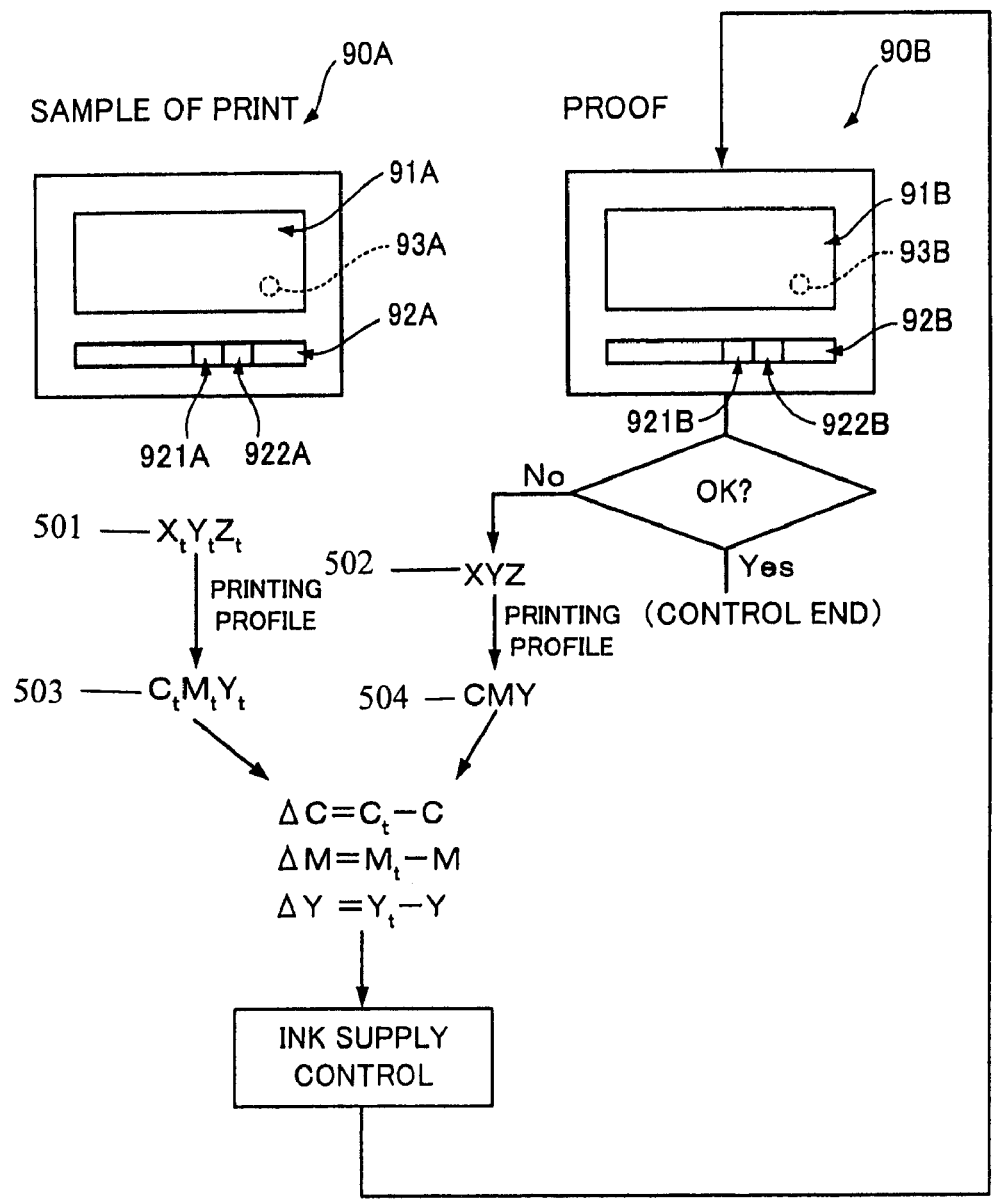
FIG. 9 is an explanatory view useful for understanding a process of a regulation of an ink supply of C, M and Y.

FIG. 9 is an explanatory view useful for understanding a process of a regulation of an ink supply of C, M and Y.

The regulated amount measuring apparatus 10 shown in FIG. 2 and so on is used for control of an ink supply of C, M and Y.

Here also there are prepared the sample (proof) 90A and the printed matter 90B of a proof.

The printed matter 90B of a proof is one which is subjected to the control of an ink supply as to K, but not one before control of an ink supply as to K or now on control, as shown in FIG. 8. In order to avoid the confusion, however, the printed matter of a proof is denoted by the reference symbol 90B.

FIG. 9 shows measurement points 93A and 93B by circle marks, of image portions 91A of 91B of the sample 90A and the printed matter 90B of a proof, respectively. It is noted that those circle marks are not real patterns or lines on the images, and are shown for the sake of convenience for the explanation. An explanation of the measurement points 93A and 93B will be made later.

Here, the patches 922A and 922B of dot percentage 60%, in which three colors of ink of C, M and Y are used in printing, are the objects of the measurement. According to the present embodiment, it is assumed that the regulated amount measuring apparatus 10 shown in FIG. 2 is used to measure the patches 922A and 922B.

First, the regulated amount measuring apparatus 10 measures the patch 922A of the sample 90A to obtain colorimetry values $X_tY_tZ_t$ 501. The $X_tY_tZ_t$ 501 are stored in the regulated amount measuring apparatus 10. The $X_tY_tZ_t$ 501 are converted into $C_tM_tY_t$ 503 in accordance with a printing profile. At that time, of the printing profile, there is used a partial profile of K0%.

Further, a printing color of the printed matter 90B of a proof is evaluated on a visual basis. When it is decided that the printing color of the printed matter 90B of a proof is not satisfied, the regulated amount measuring apparatus 10 measures the patch 922B of the printed matter 90B of a proof to obtain colorimetry values XYZ 502. The colorimetry values XYZ 502 are also converted into CMY 504 in accordance with the partial profile of K0%. Further, the regulated amount measuring apparatus 10 computes differences as set forth below.

$$\Delta C = C_t - C$$

$$\Delta M = M_t - M$$

$$\Delta Y = Y_t - Y$$

The differences $\Delta C$, $\Delta M$ and $\Delta Y$ are displayed. It may be determined in accordance with values of the differences $\Delta C$, $\Delta M$ and $\Delta Y$ as to whether ink supply of Y is to be increased, or ink supply of C and M is to be increased, for example, when the printing color of the printed matter 90B of a proof takes more on a Y-tinge as compared with the sample (proof) 90A. As a result, ink supply for CMY 504 is controlled to perform a proof again. A printing color of the printed matter obtained through the proof is evaluated on a visual basis. When it is decided that the printing color of the printed matter is sufficiently satisfied, the regulating work for the ink supply for CMY 504 is terminated. When it is decided that the printing color of the printed matter is not yet sufficiently satisfied, again there are performed the colorimetry for the printed matter 90B of a proof, which is newly obtained, the conversion using the printing profile, the computation of the differences, and the display of the differences. As a result, ink supply for CMY 504 is controlled to perform a proof again. Such a series of process is repeated until the color of the printed matter 90B of a proof matches the sample (proof) 90A with the sufficiently satisfied level.

The ink supply regulation for CMY, as mentioned above, is performed on each of channels of the ink keys.

The patches 922A and 922B are the gray patches of dot percentage 60% in which three colors of ink of C, M and Y. In case of the standard color regulation of an image, the ink supply is controlled so as to match the color of the grey patch. However, there is a necessity for some printed matters that the ink supply is controlled so that a color (for example, a skin color and a green) of the specified portion on an image matches the color of the sample of a proof. With respect to such an image, instead of the colorimetry of the patches 922A and 922B, measurement points 93A and 93B of interest of the color matching on the image, as shown by circle marks of the broken line in FIG. 9, are established as the measurement object. And differences $\Delta C \Delta M \Delta Y$ are computed in accordance with the measurement of the measurement points 93A and 93B and then are displayed. Thus, an ink supply is controlled in accordance with the displayed result. This feature makes it possible to match the color of the measurement point 93B of the printed matter 90B of a proof with the color of the measurement point 93A of the sample (proof) 90A. Alternatively, it is acceptable that both the patches 922A and 922B and the measurement points 93A and 93B are established as the measurement object, so that an ink supply is controlled in view of the balance of the colors of both of them.

The regulated amount measuring apparatus 10 according to the present embodiment is preferable for the regulation of an ink supply.

Figure 10:
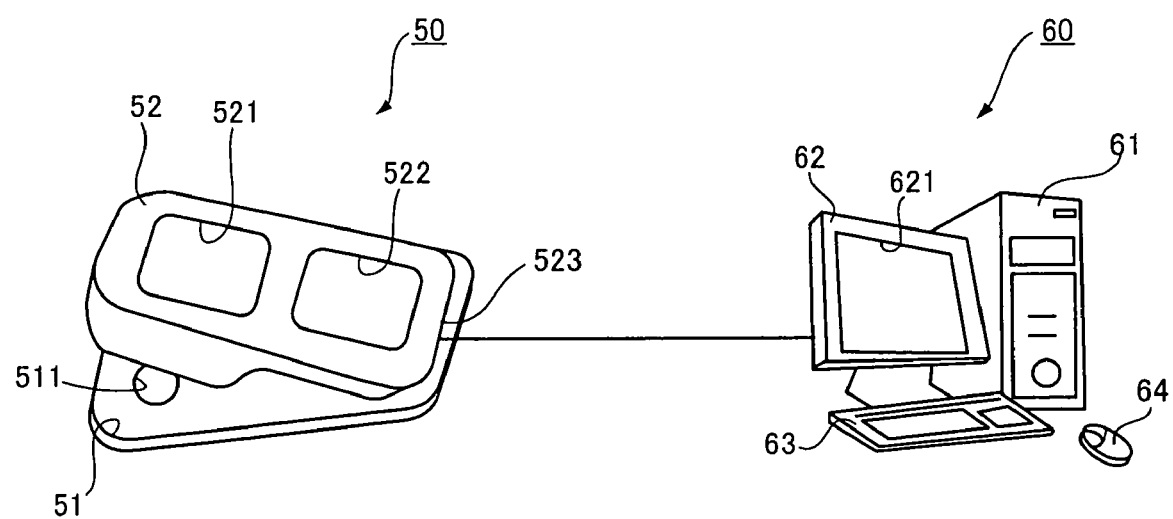
FIG. 10 is an explanatory view useful for understanding an example of a system adopting a regulated amount measuring program stored in a regulated amount measuring program storage medium according to an embodiment of the present invention.

FIG. 10 is an explanatory view useful for understanding an example of a system adopting a regulated amount measuring program stored in a regulated amount measuring program storage medium according to an embodiment of the present invention.

FIG. 10 shows a calorimeter 50 and a computer 60.

The calorimeter 50 is a usual calorimeter, which comes onto the market. The calorimeter 50 comprises a plate section 51 and a colorimetry section 52. The plate section 51 is provided with an aperture 511 for disposing the plate section 51 in such a manner that a measurement point of the measurement subject appears. The colorimetry section 52 is provided with a display section 521 and an operation panel 522. The display section 521 and an operation panel 522 of the colorimetry section 52 are for performing display and operation as the usual colorimeter. A rear end 523 of the colorimetry section 52 is connected to the plate section 51 on a hinge basis. The calorimeter 50 is similar to the regulated amount measuring apparatus 10 of the present embodiment as shown in FIG. 2 in structure.

The calorimeter 50 is similar to the regulated amount measuring apparatus 10 of the present embodiment as shown in FIG. 2 also in an internal structure. However, the signal processor 44 is for computing colorimetry values (XYZ values), and the calorimeter 50 has no functions of converting XYZ values into CMY values using a color profile (a printing profile). Instead, the calorimeter 50 has a function of transmitting the computed colorimetry values to the computer 60. In this manner, the calorimeter 50 in FIG. 10 performs up to the computation of the colorimetry values XYZ and feeds the computed colorimetry values XYZ to the computer 60. Alternatively, it is acceptable that the calorimeter 50 performs up to a measurement of light quantity on each of the wavelengths obtained by the sensor 43 shown in FIG. 4, and transmits the light quantity values on the respective wavelengths to the computer 60, so that the computer 60 computes the colorimetry values XYZ in accordance with the transmitted light quantity values on the respective wavelengths.

The computer 60 shown in FIG. 10 comprises a main frame unit 61 incorporating therein CPU, and a hard disk unit, an image display unit 62 for displaying an image on a display screen 621, a keyboard 63 for inputting various sorts of information to the main frame unit 61 in accordance with a key operation, and a mouse 64 for inputting an instruction according to, for example, an icon and the like, through designation of an optional position on the display screen 621, the icon and the like being displayed on the position on the display screen 621.

Figure 11:
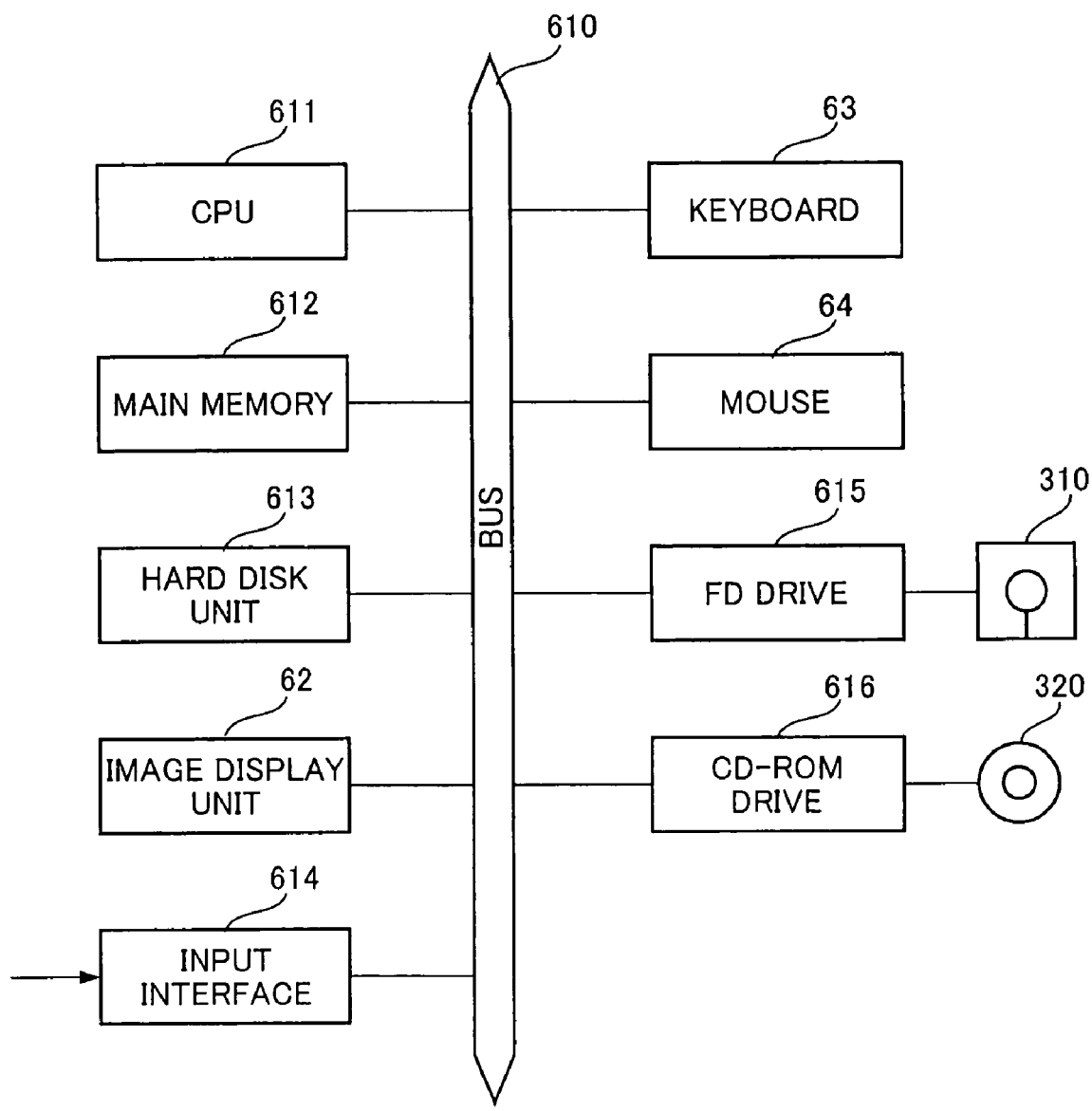
FIG. 11 is a hardware structural view of the personal computer shown in FIG. 10.

FIG. 11 is a hardware structural view of the personal computer shown in FIG. 10.

The main frame unit 61 comprises, as shown in FIG. 11, a CPU 611 for executing a various types of program, a main memory 612 in which a program stored in a hard disk unit 613 is read out and developed for execution by the CPU 611, the hard disk unit 613 for saving various types of programs and data, a flexible disk drive 615 for accessing a flexible disk (FD) 310 mounted thereon, a CD-ROM drive 616 for accessing a CD-ROM 320 mounted thereon, an input interface 614 for receiving colorimetry data from the calorimeter 50 shown in FIG. 10. These various types of elements are connected via a bus 610 to the image display unit 62, the keyboard 63 and the mouse 64.

Figure 12:
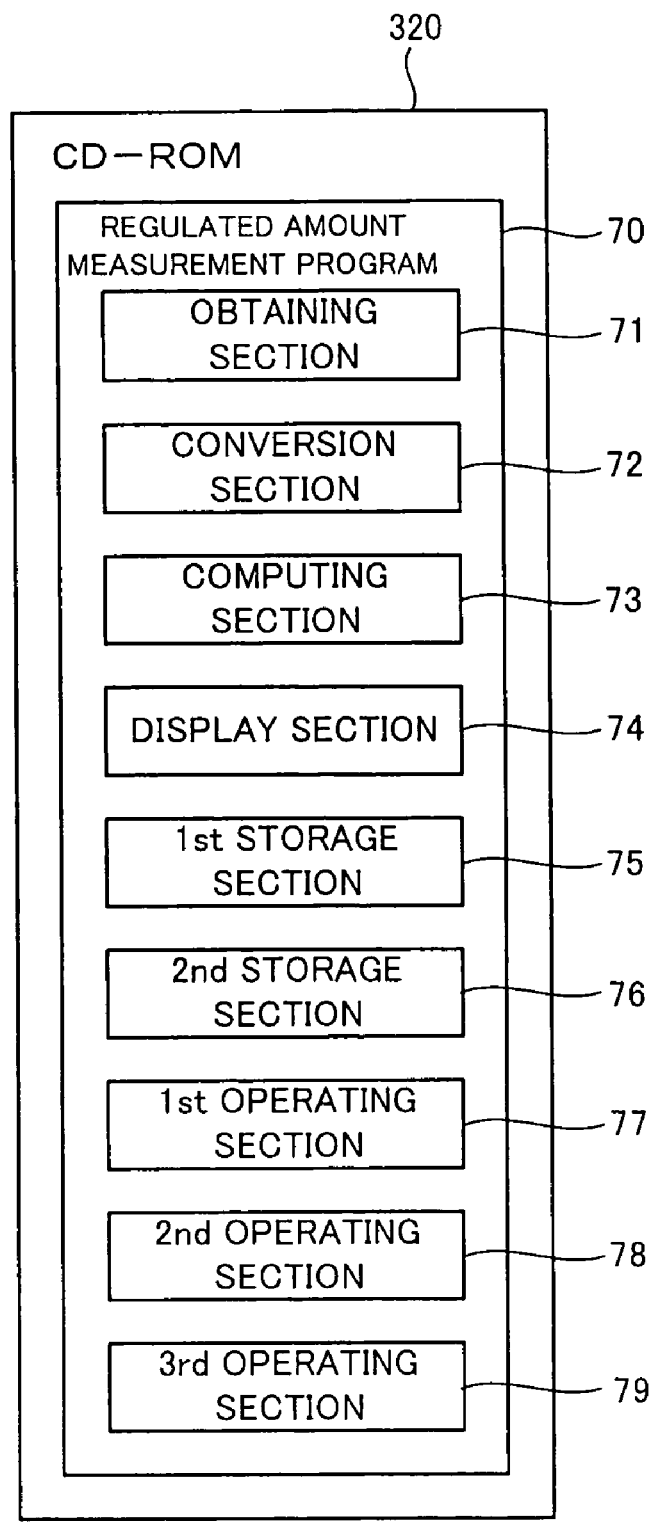
FIG. 12 is a conceptual view showing a CD-ROM storing a regulated amount measuring program.

FIG. 12 is a conceptual view showing a CD-ROM storing a regulated amount measuring program.

The CD-ROM 320 shown in FIG. 12 stores therein a regulated amount measuring program 70. The regulated amount measuring program 70 comprises an obtaining section 71, a conversion section 72, a computing section 73, a display section 74, a first storage section 75, a second storage section 76, a first handler 77, a second handler 78, and a third handler 79.

The CD-ROM 320 storing therein the regulated amount measuring program 70 shown in FIG. 12 is mounted on the CD-ROM drive 616 (cf. FIG. 11) of the computer 60 shown in FIG. 10 and FIG. 11, so that the regulated amount measuring program 70 stored in the CD-ROM 320 is uploaded on the computer 60 so as to be stored in the hard disk unit 613. When the regulated amount measuring program 70 stored in the hard disk unit 613 is developed in the main memory 612 shown in FIG. 11 and is executed by the CPU 611, the computer 60 serves as an apparatus having the same functions as the regulated amount measuring apparatus 10 shown in FIG. 1 according to the embodiment of the present invention, when it is combined with the calorimeter 50 shown in FIG. 10.

With respect to functions of the respective sections 71 to 79 of the regulated amount measuring program 70 shown in FIG. 12, it will be described later.

Figure 13:
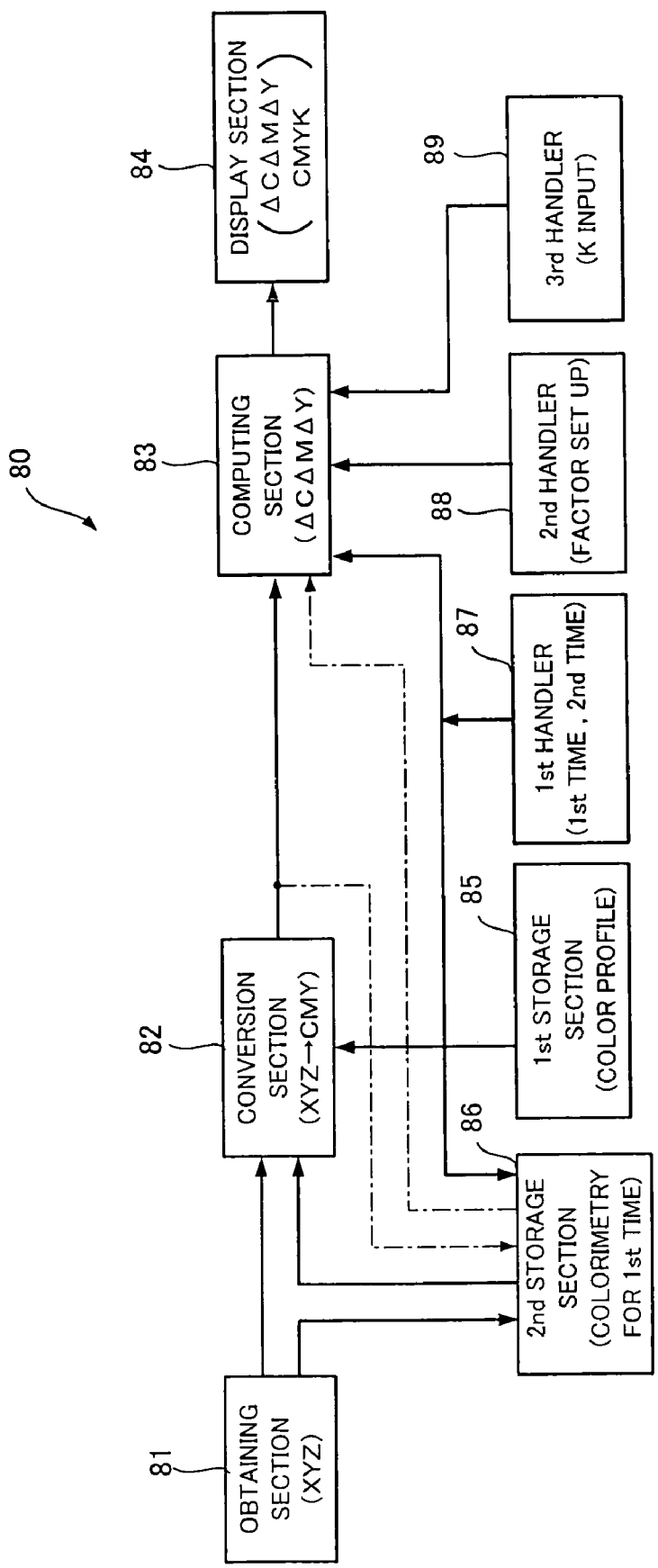
FIG. 13 is a functional block diagram useful for understanding functions to be implemented in the computer in accordance with the regulated amount measuring program shown in FIG. 12.

FIG. 13 is a functional block diagram useful for understanding functions to be implemented in the computer 60 in accordance with the regulated amount measuring program 70 shown in FIG. 12.

As explained in conjunction with FIG. 10, with respect to the colorimetry, there is provided the calorimeter 50. While the functional block diagram of FIG. 13 lacks elements of the colorimetry, here, for the sake of convenience, the structure shown in FIG. 13 is referred to as a regulated amount measuring apparatus 80.

The regulated amount measuring apparatus 80 shown in FIG. 13 comprises an obtaining section 81, a conversion section 82, a computing section 83, a display section 84, a first storage section 85, a second storage section 86, a first handler 87, a second handler 88, and a third handler 89.

The obtaining section 81 is a functional portion of receiving colorimetry values XYZ transmitted from the calorimeter 50 shown in FIG. 10. On a hardware basis, the obtaining section 81 corresponds to a composite of the input interface 614 shown in FIG. 11 and the CPU 611 for executing a program, and is implemented by execution of the obtaining section 71 of the regulated amount measuring program 70 shown in FIG. 12.

The conversion section 82 and the computing section 83 correspond, on a hardware basis, to the CPU 611 shown in FIG. 11, and is implemented by execution of the conversion section 72 and the computing section 73 of the regulated amount measuring program 70, as shown in FIG. 12, by the CPU 611.

The display section 84 of the regulated amount measuring apparatus 80 shown in FIG. 13 mainly corresponds, on a hardware basis, to the image display unit 62 shown in FIG. 10 and FIG. 11. The display section 84 is implemented by execution of the display section 74 of the regulated amount measuring program 70, as shown in FIG. 12.

The first storage section 85 and the second storage section 86 of the regulated amount measuring apparatus 80 shown in FIG. 13 mainly correspond to the hard disk unit 613 in FIG. 11. The first storage section 85 and the second storage section 86 are implemented by the execution of the first storage section 75 and the second storage section 76 of the regulated amount measuring program 70 shown in FIG. 12.

The first handler 87, the second handler 88, and the third handler 89 of the regulated amount measuring apparatus 80 shown in FIG. 13 mainly correspond, on a hardware basis, to the keyboard 63 and the mouse 64 shown in FIG. 10 and FIG. 11. The first handler 87, the second handler 88, and the third handler 89 of the regulated amount measuring apparatus 80 shown in FIG. 13 are implemented by the execution of first handler 77, the second handler 78, and the third handler 79 of the regulated amount measuring program 70 shown in FIG. 12.

In the comparison of the regulated amount measuring apparatus 80 shown in FIG. 13 with the regulated amount measuring apparatus 10 shown in FIG. 1, the regulated amount measuring apparatus 10 shown in FIG. 1 is provided with the colorimetry section 11. On the other hand, the regulated amount measuring apparatus 80 shown in FIG. 13 has no colorimetry section, but as shown in FIG. 10, the calorimeter 50 is connected to the regulated amount measuring apparatus 80. Thus, the regulated amount measuring apparatus 80 has the obtaining section 81 for obtaining the colorimetry values XYZ obtained through the colorimetry by the calorimeter 50.

Other construction sections of the regulated amount measuring apparatus 80 shown in FIG. 13, that is, the conversion section 82, the computing section 83, the display section 84, the first storage section 85, the second storage section 86, the first handler 87, the second handler 88, and the third handler 89, correspond to the conversion section 12, the computing section 13, the display section 14, the first storage section 15, the second storage section 16, the first handler 17, the second handler 18, and the third handler 19, respectively, which constitute the regulated amount measuring apparatus 10 shown in FIG. 1. Accordingly, there will be omitted the explanation for the functions of those sections 82 to 89.

According to the embodiments, as the colorimetry values, there are raised CIEXYZ. However, there is no need that the colorimetry values are CIEXYZ. It is acceptable that the colorimetry values are L*a*b* and the like. Further according to the embodiments, there is raised mainly an example of the regulation of colors of the printed matter. However, a regulated amount measuring apparatus of the present invention is applicable to a case where a color of a display screen of a display unit, such as a CRT display unit and a liquid crystal display unit, is regulated to the same color as a proof. in this case, there is used a color profile representative of an association between colorimetry values of the proof and red (R), green (G) and blue (B), which are light emission colors of the display screen.

As mentioned above, according to the present invention, it is possible to perform a regulation of an ink supply in printing for instance, without trusting a skilled operator's experience and intuition, since there is provided an index for a regulation for matching a color now on regulation with a target color.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A regulated amount measuring apparatus comprising:
a colorimetry section that measures colors;
a first storage section that stores a color profile associating coordinate values on a colorimetry color space representative of colorimetry values obtained through the colorimetry section with coordinate values on a device color space, wherein a plurality of primary colors adopted in an image output device is established as a coordinate axis;
a conversion section that converts the colorimetry values obtained through the colorimetry section into the coordinate values on a device color space via the color profile;

a computing section that computes differences between two sets of coordinate values on the device color space, which are obtained through conversion by the conversion section of two sets of colorimetry values obtained through twice colorimetry by the colorimetry section; and a display section that displays the differences computed by the computing section.

2. A regulated amount measuring apparatus according to claim 1, wherein the regulated amount measuring apparatus further comprises a first handler that discriminates a distinction between a first colorimetry and a second colorimetry, of the twice colorimetry that is a base for a computation of the differences by the computing section.

3. A regulated amount measuring apparatus according to claim 1, wherein the regulated amount measuring apparatus further comprises a second storage section that stores colorimetry values obtained through the first colorimetry, of the twice colorimetry that is a base for a computation of the differences by the computing section, or coordinate values on the device color space obtained from the colorimetry values via the color profile.

4. A regulated amount measuring apparatus according to claim 2, wherein the regulated amount measuring apparatus further comprises a second storage section that stores colorimetry values obtained through the first colorimetry, of the twice colorimetry that is a base for a computation of the differences by the computing section, or coordinate values on the device color space obtained from the colorimetry values via the color profile.

5. A regulated amount measuring apparatus according to claim 1, wherein the regulated amount measuring apparatus further comprises a second handler that sets up factors for the plurality of primary colors independently of one another, wherein the computing section multiplies the differences computed in the computing section by the factors, and wherein the display section displays differences after multiplication by the factors in the computing section.

6. A regulated amount measuring apparatus according to claim 1, wherein the color profile associates the coordinate values on the colorimetry color space with coordinate values on the device color space, wherein colors of cyan, magenta, yellow and black are established as a coordinate axis, wherein the regulated amount measuring apparatus further comprises a third handler that inputs the coordinate values on the device color space, and wherein the display section displays the coordinate values on the device color space, which are determined by colorimetry for a first time, as well as the differences determined by colorimetry for a second time.

7. A regulated amount measuring program storage medium storing a regulated amount measuring program, which causes an arithmetic processing apparatus to operate as the regulated amount measuring apparatus, the regulated amount measuring apparatus comprising:

an obtaining section that obtains colorimetry values;

a first storage section that stores a color profile associating coordinate values on a colorimetry color space representative of the colorimetry values obtained through the obtaining section with coordinate values on a device color space, wherein a plurality of primary colors adopted in an image output device is established as a coordinate axis;

a conversion section that converts the colorimetry values obtained through the obtaining section into the coordinate values on a device color space via the color profile;

a computing section that computes differences between two sets of coordinate values on the device color space, which are obtained through conversion by the conversion section of two sets of colorimetry values obtained in the obtaining section; and a display section that displays the differences computed by the computing section.

8. A regulated amount measuring program storage medium storing a regulated amount measuring program according to claim 7, wherein the regulated amount measuring apparatus further comprises a first handler that discriminates a distinction between a first colorimetry and a second colorimetry, of the two sets of colorimetry values which are a base for a computation of the differences by the computing section.

9. A regulated amount measuring program storage medium storing a regulated amount measuring program according to claim 7, wherein the regulated amount measuring apparatus further comprises a second storage section that stores colorimetry values obtained through the first colorimetry, of the two sets of colorimetry values which are a base for a computation of the differences by the computing section, or coordinate values on the device color space obtained from the colorimetry values via the color profile.

10. A regulated amount measuring program storage medium storing a regulated amount measuring program according to claim 8, wherein the regulated amount measuring apparatus further comprises a second storage section that stores colorimetry values obtained through the first colorimetry, of the two sets of colorimetry values which are a base for a computation of the differences by the computing section, or coordinate values on the device color space obtained from the colorimetry values via the color profile.

11. A regulated amount measuring program storage medium storing a regulated amount measuring program according to claim 7, wherein the regulated amount measuring apparatus further comprises a second handler that sets up factors for the plurality of primary colors independently of one another, wherein the computing section multiplies the differences computed in the computing section by the factors, and wherein the display section displays differences after multiplication by the factors in the computing section.

12. A regulated amount measuring program storage medium storing a regulated amount measuring program according to claim 7, wherein the color profile associates the coordinate values on the colorimetry color space with coordinate values on the device color space, wherein colors of cyan, magenta, yellow and black are established as a coordinate axis, wherein the regulated amount measuring apparatus further comprises a third handler that inputs the coordinate values on the device color space, and wherein the display section displays the coordinate values on the device color space, which are determined by colorimetry for a first time, as well as the differences determined by colorimetry for a second time.

13. The regulated amount measuring apparatus according to claim 1, wherein the device color space comprises a cyan, magenta, yellow (CMY) color space having dot percents of color inks of CMY denoting the coordinate axes.

14. The regulated amount measuring program storage medium storing a regulated amount measuring program according to claim 7, wherein the device color space comprises a cyan, magenta, yellow (CMY) color space having dot percents of color inks of CMY denoting the coordinate axes.

* * * * *